US012523347B2

(12) United States Patent
Allen

(10) Patent No.: US 12,523,347 B2
(45) Date of Patent: Jan. 13, 2026

(54) ILLUMINATED ACCESSORY ASSEMBLY FOR MOTORIZED VESSELS AND METHOD OF MOUNTING THE SAME

(71) Applicant: Research & Design Innovations, LLC, Branford, CT (US)

(72) Inventor: Donald Terry Allen, Madison, CT (US)

(73) Assignee: Research & Design Innovations, LLC, Branford, CT (US)

( * ) Notice: Subject to any disclaimer, the term of this patent is extended or adjusted under 35 U.S.C. 154(b) by 0 days.

(21) Appl. No.: 18/886,457

(22) Filed: Sep. 16, 2024

(65) Prior Publication Data

US 2025/0093002 A1 Mar. 20, 2025

Related U.S. Application Data

(60) Provisional application No. 63/538,597, filed on Sep. 15, 2023.

(51) Int. Cl.

*F21S 4/28* (2016.01)
*B60Q 1/00* (2006.01)
(Continued)

(52) U.S. Cl.

CPC .............. *F21S 4/28* (2016.01); *B60Q 1/0088* (2013.01); *F21V 21/02* (2013.01); *F21V 23/002* (2013.01);
(Continued)

(58) Field of Classification Search

CPC ............ F21W 2111/08; F21W 2111/05; F21Y 2103/37; F21V 19/008; F21V 23/002; F21S 4/28; B50Q 1/0088
See application file for complete search history.

(56) References Cited

U.S. PATENT DOCUMENTS

| | | | |
|---|---|---|---|
| 6,539,886 | B2 | 4/2003 | Henry et al. |
| 7,028,629 | B2 | 4/2006 | Walcome |

(Continued)

FOREIGN PATENT DOCUMENTS

| | | | |
|---|---|---|---|
| CA | 2143302 | A1 | 3/1994 |
| DE | 2012005351 | A1 | 9/2013 |

OTHER PUBLICATIONS

Https://www.camperid.com/ap-products/21-0-l-clear-lighted-assist-handle-mpn-005-5500-l.html.

(Continued)

*Primary Examiner* — Erin Kryukova
(74) *Attorney, Agent, or Firm* — DeLio Peterson & Curcio LLC; David R. Pegnataro

(57) ABSTRACT

An illuminated accessory device and method for mounting the same on a surface of a motorized vessel. A fastener or post is integral with or connected to a mounting surface of the accessory device having an opening therein, wherein the fastener or post has a channel extending along a length thereof and wherein the channel is aligned with an enclosed channel of the accessory device terminating at one end at the mounting surface opening. A wire harness extends within the accessory device enclosed channel and through the fastener or post channel, wherein the wire harness is electrically connected at a first end to a light source disposed within or secured to the accessory device and has a terminal end extending beyond a distal end of the fastener or post. The method comprises connecting the terminal end of the wire harness to an electrical power source of the motorized vessel, and engaging the fastener or post with an opening in an installation surface of the motorized vessel.

20 Claims, 6 Drawing Sheets

(51) Int. Cl.

| | |
|---|---|
| ***F21V 21/02*** | (2006.01) |
| ***F21V 23/00*** | (2015.01) |
| ***F21W 111/08*** | (2006.01) |
| ***F21Y 103/37*** | (2016.01) |
| ***F21Y 115/10*** | (2016.01) |

(52) U.S. Cl.

CPC ....... *F21W 2111/08* (2013.01); *F21Y 2103/37* (2016.08); *F21Y 2115/10* (2016.08)

(56) References Cited

U.S. PATENT DOCUMENTS

| | | | | |
|---|---|---|---|---|
| 7,500,443 | B1 | 3/2009 | Allen | |
| 8,936,551 | B2 | 1/2015 | Vayser et al. | |
| 10,393,362 | B2 | 8/2019 | Wallace | |
| 10,632,968 | B2 | 4/2020 | De Wind et al. | |
| 11,130,442 | B2 | 9/2021 | Dingman et al. | |
| 11,235,699 | B2 | 2/2022 | Sobecki et al. | |
| 12,098,836 | B2 | 9/2024 | Allen et al. | |
| 2003/0081401 | A1* | 5/2003 | Camarota | A47K 3/003 362/337 |
| 2010/0110681 | A1* | 5/2010 | Wilcox | B63B 45/04 362/235 |
| 2012/0140494 | A1* | 6/2012 | Gu | F21V 23/002 362/411 |
| 2013/0058074 | A1* | 3/2013 | Somei | F21V 33/006 362/145 |
| 2013/0058087 | A1* | 3/2013 | Chang | F21S 8/04 362/249.02 |
| 2016/0236757 | A1 | 8/2016 | Davis et al. | |
| 2016/0243978 | A1 | 8/2016 | Speropoulos | |
| 2018/0023800 | A1* | 1/2018 | Jean | F21V 23/002 362/145 |
| 2018/0059318 | A1 | 3/2018 | Nichol et al. | |
| 2020/0040586 | A1* | 2/2020 | Chen | F21V 23/02 |

OTHER PUBLICATIONS

Https://www.mickeyparts.com/lighted-grab-handle.html.

Https://thmarinesupplies.com/products/led-grab-handle.

Https://www.amazon.com/KIMISS-338-5mm-Lighted-Stainless-Strength/dp/B09MNHCW77.

Marine-Grab-Handle-Boat-Handrail-Led-Luminous-Button-Control-Switch-Zinc-Alloy-For-Marine-Yacht-Rv-Motorhome-For-Camping-Cars-Bathrooms-Stairways/5076965590?wmlspartner=wlpa&selectedSellerId=101503000—Walmart.com.

* cited by examiner

ILLUMINATED ACCESSORY ASSEMBLY FOR MOTORIZED VESSELS AND METHOD OF MOUNTING THE SAME

BACKGROUND OF THE INVENTION

1. Field of the Invention

The present invention relates generally to illuminated accessory assemblies for marine vessels or recreational land vehicles. More specifically, the present invention relates to a securing means for mounting an illuminated accessory assembly on a surface of a marine vessel or recreational land vehicle.

2. Description of Related Art

Illuminated hand rails on motorized vessels are useful for allowing a passenger or crew member to easily identify the handrail in low lighting conditions. On conventional grab handles, attachment points are found on the handle escutcheon, hindering the permissible size and/or gauge of the attachment points ("anchors"). Due to size constraints of these anchors, it is difficult to run electrical connectors through additional openings under the grab handle's installation points. Moreover, wire harnesses typically require the drilling of an additional hole in the installation mount to feed the wire harness through, adding both cost and complexity to the installation of hand rails or other accessory devices requiring, or being adapted to utilize, an electrical connection.

Therefore, a need exists for an improved means for mounting an illuminated accessory device on a motorized vessel, which simplifies installation and reduces costs.

SUMMARY OF THE INVENTION

Bearing in mind the problems and deficiencies of the prior art, it is therefore an object of the present invention to provide an improved means for mounting an illuminated accessory assembly on a motorized vessel.

It is another object of the present invention to provide an improved method of installing an illuminated accessory assembly that eliminates the need to drill a separate wiring hole through the installation surface or the accessory assembly itself.

A further object of the present invention is to provide an improved fastening post for an illuminated accessory assembly which can receive a wire harness therethrough for installation on a motorized vessel.

Still another object of the present invention is to provide a retrofittable illuminated accessory assembly for a motorized vessel, wherein the wiring can be tied into the onboard electronics without requiring the installation of new wiring.

Still other objects and advantages of the invention will in part be obvious and will in part be apparent from the specification.

The above and other objects, which will be apparent to those skilled in the art, are achieved in the present invention which is directed in one aspect to a method of installing an illuminated accessory device on a surface of a motorized vessel. The method includes providing an accessory device or assembly comprising a mounting surface for mounting to an installation surface of the motorized vessel, wherein the mounting surface has at least one opening, and a channel terminating at one end at the mounting surface opening. A light source is disposed within or secured to the accessory device and has an illumination surface flush or substantially flush with an outer surface of the accessory device. A fastener or post is integral with or connected to the accessory device mounting surface, wherein the fastener or post comprises a channel extending between proximal and distal ends along a length thereof, and further comprises an external engagement surface. A wire harness extends within the accessory device channel and through the fastener or post channel, wherein the wire harness is electrically connected at a first end to the light source and has a terminal end extending beyond the distal end of the fastener or post. The method further comprises connecting the terminal end of the wire harness to an electrical power source of the motorized vessel, and engaging the external engagement surface of the fastener or post with an opening in an installation surface of the motorized vessel.

In an embodiment, the accessory device may comprise a hand rail or grab bar, a communication device, a navigation device, an instrument panel, a cup holder, or a device holder. In at least one embodiment, the fastener or post is a substantially cylindrical, open-ended threaded post, and the step of engaging the external engagement surface of the fastener or post with an opening in an installation surface of the motorized vessel may further comprise engaging the threaded post with an internally threaded nut of the installation surface to secure the accessory device to the installation surface.

In one or more embodiments, the method may further comprise the steps of providing power to the light source via the wire harness, and illuminating an area proximate the accessory device.

In another aspect, the present invention is directed to a hand rail or grab bar for providing illumination to a surface of a motorized vessel. The hand rail comprises a central bar member having opposing ends and a pair of feet, each foot disposed at one end of the central bar member and at least one foot comprising an opening. The central bar member comprises a channel in an interior portion thereof, wherein the channel terminates at one or both ends at the foot opening or openings. A light source is disposed within or connected to the central bar member and has an illumination surface flush or substantially flush with an outer surface of the central bar member. A fastener or post is integral with or connected to each foot of the pair of feet, wherein one or both fasteners or posts may comprise a channel extending between proximal and distal ends along a length thereof. A wire harness extends within the central bar member channel and through the fastener or post channel, wherein the wire harness is electrically connected at a first end to the light source and has a terminal end extending beyond the distal end of the fastener or post. The fastener or post channel may be aligned with an end of the central bar member channel so as to permit feeding of the wire harness therethrough. Upon connection of the wire harness terminal end to a power source, the light source is adapted to illuminate an area proximate the hand rail.

In an embodiment, each fastener or post may further comprise a flange welded or bonded to its adjacent foot, and each foot may have a diameter larger than the outer diameter of the central bar member. In one or more embodiments, the hand rail central bar member may be at least partially arcuate such that the bottom surface of each of the hand rail feet are parallel, so as to aid in mounting the hand rail to the installation surface of the motorized vessel.

Each fastener or post may be comprised of a polymer, a metal, or a metal alloy, and may further comprise an external engagement surface for engaging an opening in an installation surface of the motorized vessel. In one or more embodiments, the external engagement surface may be threaded and the fastener or post may be a substantially cylindrical, open-ended threaded post.

In at least one embodiment, the light source may be secured within the central bar member channel. The central bar member may further comprise a slot and the light source may be received within the slot. In one or more embodiments, the light source may be LED strip lighting.

In still another aspect, the present invention is directed to an illuminated accessory device for use on a motorized vessel. The accessory device comprises a mounting surface for mounting to the surface of the motorized vessel, wherein the mounting surface has at least one opening, and a channel terminating at one end at the mounting surface opening. The accessory device further comprises a light source disposed within or secured to the accessory device and having an illumination surface flush or substantially flush with an outer surface of the accessory device. A fastener or post is integral with or connected to the accessory device mounting surface, wherein the fastener or post comprises a channel extending between proximal and distal ends along a length thereof, and further comprises an external engagement surface. A wire harness extends within the accessory device channel and through the fastener or post channel, wherein the wire harness is electrically connected at a first end to the light source and has a terminal end extending beyond the distal end of the fastener or post. Upon connection of the wire harness terminal end to a power source, the light source is adapted to illuminate an area proximate the accessory device. In an embodiment, the accessory device may comprise a hand rail or grab bar, a communication device, a navigation device, an instrument panel, a cup holder, or a device holder.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE EMBODIMENT(S)

Figure 1:
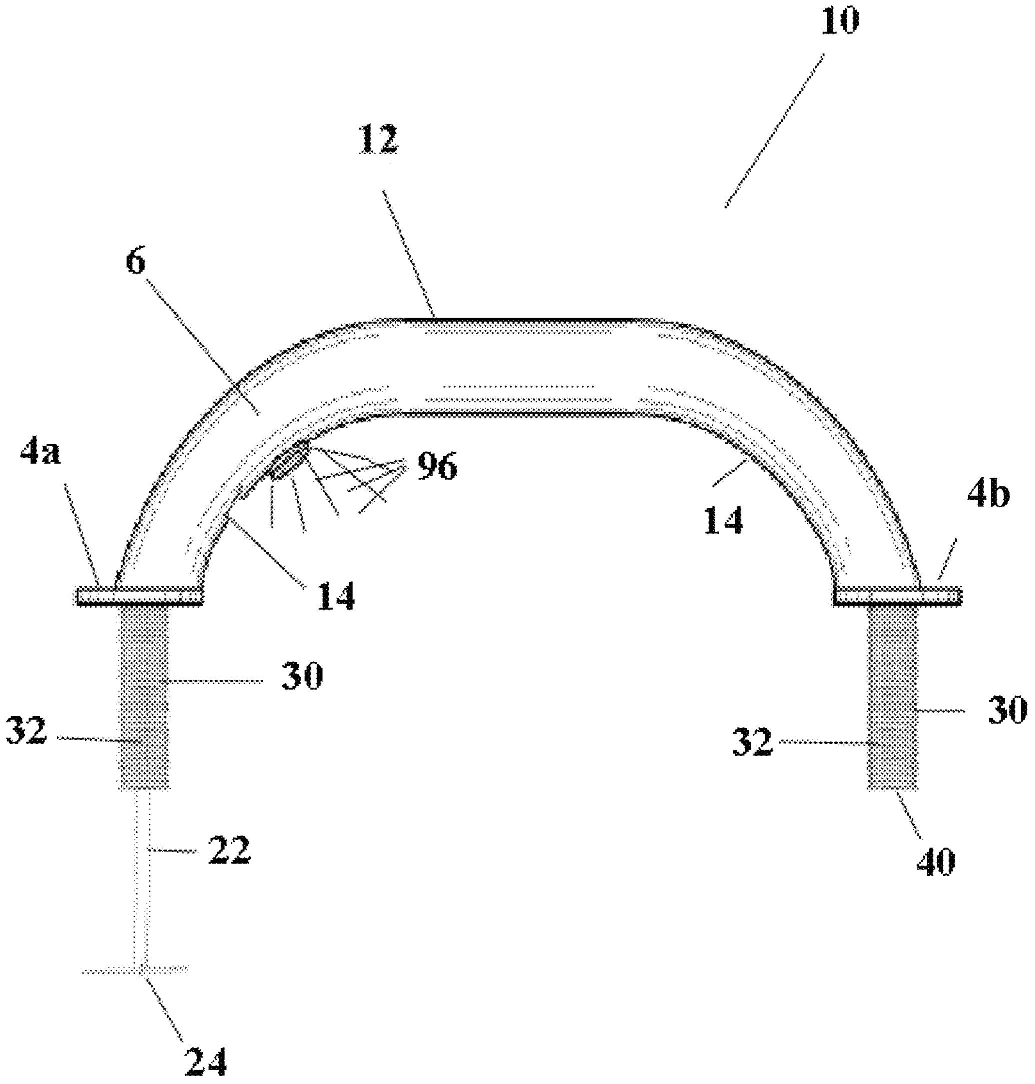
FIG. 1 is a side plan view of a lighted grab bar including at least one hollow fastener or post according to an embodiment of the present invention.
Figure 2:
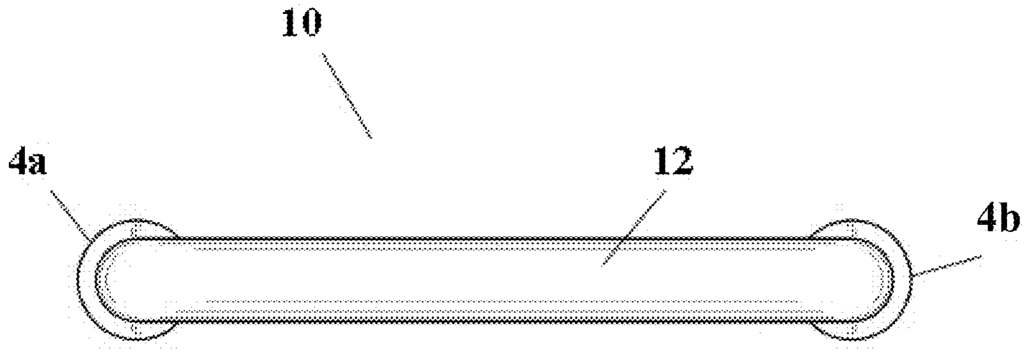
FIG. 2 is a top plan view of the lighted grab bar of FIG. 1.

In describing the embodiments of the present invention, reference will be made herein to FIGS. 1-8 of the drawings, in which like numerals refer to like features of the invention.

Certain terminology is used herein for convenience only and is not to be taken as a limitation of the invention. For example, words such as “upper,” “lower,” “left,” “right,” “front,” “rear,” “horizontal,” “vertical,” “upward,” “downward,” “clockwise,” “counterclockwise,” “longitudinal,” “lateral,” or “radial”, or the like, merely describe the configuration shown in the drawings. Indeed, the referenced components may be oriented in any direction and the terminology, therefore, should be understood as encompassing such variations unless specified otherwise. For purposes of clarity, the same reference numbers may be used in the drawings to identify similar elements.

It should be understood that although the terms “first,” “second,” etc., may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the singular forms “a”, “an” and “the” are intended to include the plural forms as well, unless the context clearly indicates otherwise. Also, as used herein, the term “and/or” includes any and all combinations of one or more of the associated listed items. It should be further understood that the terms “include” and/or “including” when used herein, specify the presence of stated features, steps, operations, elements, and/or components, but do not preclude the presence or addition of one or more other features, steps, operations, elements, components, and/or groups thereof.

It should be further understood that when an element is referred to as being “on” or extending “onto” another element, it can be directly on or extend directly onto the other element, or intervening elements may be present. In contrast, when an element is referred to as being “directly on” or extending “directly onto” another element, there are no intervening elements present. It should also be understood that when an element is referred to as being “connected,” “coupled”, “operatively coupled”, or the like, to another element, it can be directly connected, coupled, or operatively coupled to the other element or intervening elements may be present. Moreover, it can be removable or integral with the other element and/or intervening elements. In contrast, when an element is referred to as being “directly connected”, “directly coupled”, or “directly operatively coupled” to another element, there are no intervening elements present.

Additionally, in the subject description, the words “exemplary,” “illustrative,” or the like, are used to mean serving as an example, instance or illustration. Any aspect or design described herein as “exemplary” or “illustrative” is not necessarily intended to be construed as preferred or advantageous over other aspects or design. Rather, the use of the words “exemplary” or “illustrative” is merely intended to present concepts in a concrete fashion.

Embodiments of the hollow fastener or post according to the present invention may be used to secure accessories requiring an electrical connection to a surface of a marine vessel or recreational land vehicle. As used herein, the terms “accessory” or “accessories” may include any object or device that may be structurally mounted to a surface on a marine vessel or recreational land vehicle, including but not limited to, a seat, table, hand rail or grab bar, communication or navigation device, instrument panel, device holder, cup holder, rod, stanchion, pole or pedestal. The terms “surface” or “installation surface” as used herein with reference to a marine vessel or recreational land vehicle may include any surface in or on a motorized vessel which is intended to be illuminated, such as an inside or outside deck, floor, wall, ceiling, cabin top or side, gunwale or hull.

An exemplary use of the hollow fastener or post of the present invention is in connection with a lighted grab bar or hand rail on a motorized vessel. Illuminated hand rails are useful for allowing a passenger or crew member to easily identify the handrail in low lighting conditions. On conventional grab handles, attachment points are found on the handle escutcheon, hindering the permissible size and/or gauge of the attachment points ("anchors"), which are typically solid studs. Due to size constraints of these anchors, it is difficult to run electrical connectors through additional openings under the grab handle's installation points. Moreover, wire harnesses typically require the drilling of an additional hole in the installation mount to feed the wire harness through, adding both cost and complexity to the installation of hand rails or other accessory devices requiring or being adapted to utilize an electrical connection. The present invention solves these deficiencies, readily allowing the wiring of electrical connectors of varying sizes, shapes, gauges, and amounts directly through the connecting fastener or post of the accessory, eliminating the need for additional drilling.

An exemplary lighted grab bar or hand rail including an embodiment of the hollow fastener or post of the present invention is shown in FIGS. 1-4, inclusive. Grab bar 10 may comprise an open-ended, semi-arcuate bar member 12 including curved portions 14 terminating at opposing ends or feet 4*a*, 4*b*. Each foot 4*a*, 4*b* may have an outer diameter slightly larger than the outer diameter of the central bar member 12, and feet 4*a*, 4*b* are disposed at opposite ends of the central bar 12. As shown in FIG. 1, the central bar 12 may be at least partially curved or may have curved features to allow the feet 4*a*, 4*b* to have a bottom surface substantially parallel with one another to facilitate mounting to an installation surface. Feet 4*a*, 4*b* are mounted substantially flush with the installation surface of the motorized vessel, upon installation. As will be described in more detail below, grab bar or hand rail 10 may include a substantially cylindrical open-ended threaded post 30 integral with or connected to, and extending from, one or both feet 4*a*, 4*b*.

Figure 3:
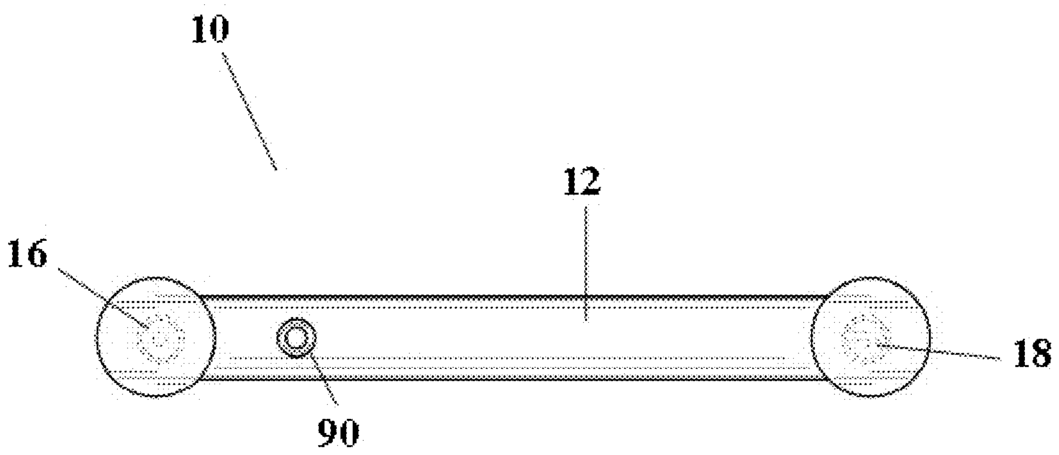
FIG. 3 is a bottom plan view of the lighted grab bar of FIG. 1.
Figure 4:
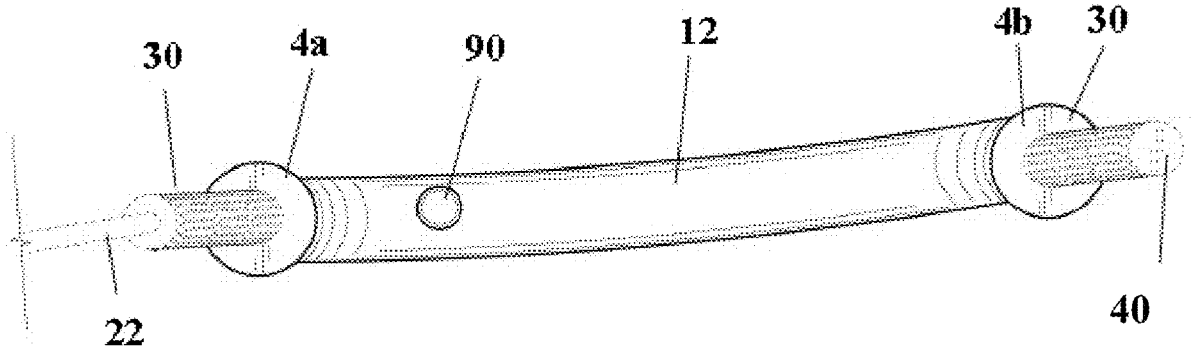
FIG. 4 is a bottom perspective view of the lighted grab bar of FIG. 1, with a portion of a wire harness extending from within the grab bar and through a fastener or post at the foot of the grab bar.
Figure 6:
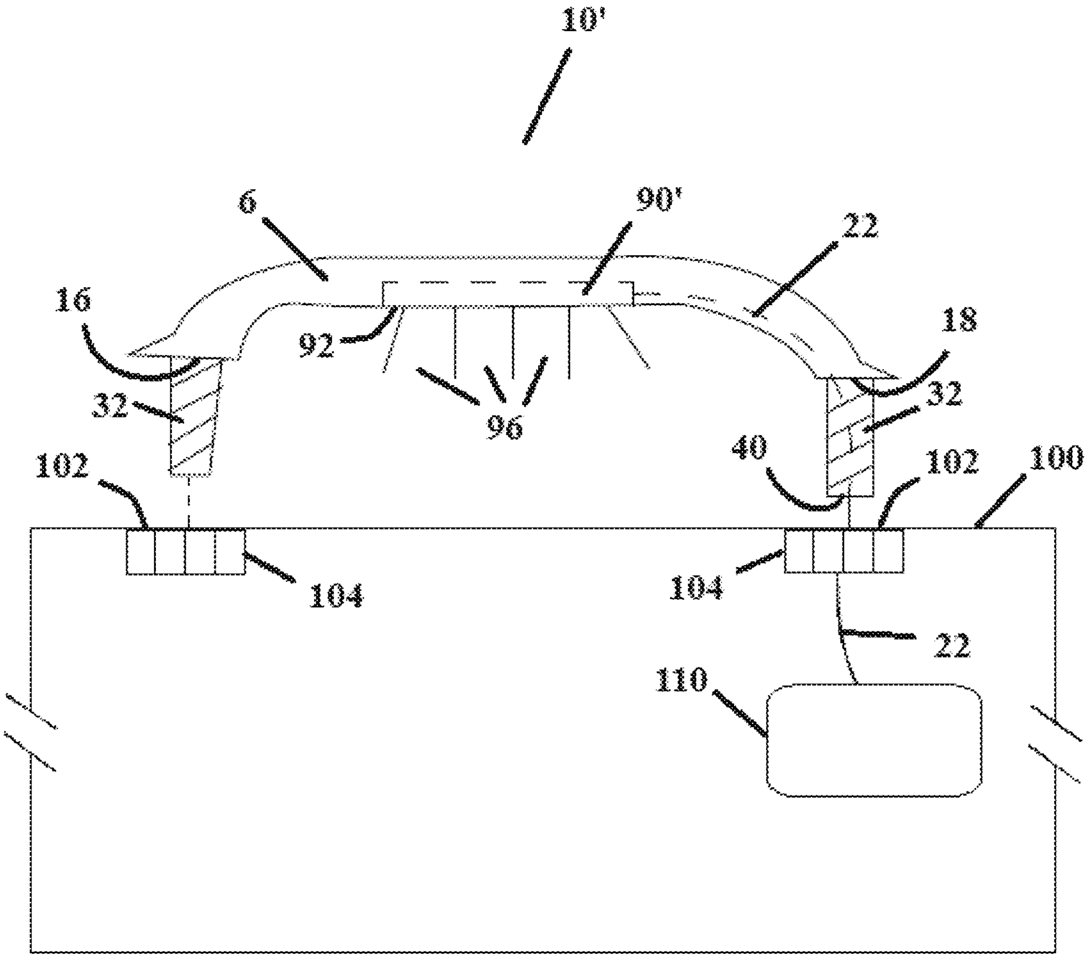
FIG. 6 is a partially exploded, side plan view of a lighted grab bar including a hollow fastener or post according to the present invention. secured to an installation surface of a motorized vessel.

Hand rail or grab bar 10 may include a hollow channel 6 extending between openings 16, 18 in one end of each foot 4*a*, 4*b* (FIGS. 1, 3). Channel 6 may include a lighted element 90 capable of emitting light rays 96 to illuminate an area proximate the hand rail. Lighted element 90 may be secured within channel 6 or anywhere on the open-ended semi-arcuate member 12. Electrical connectors or wire assembly 22 may be secured to the lighted element 90 and fed through the channel 6 to one or more of the openings 16, 18. After assembly, the terminal end 24 of the wire harness 22 may be connected to an external power source 110 (FIG. 6) for operation of the lighted element. The terminal end of the wire harness may comprise a waterproof multi-pin connector such as a Deutsch® connector, or any other now-known or later-developed electrical connector, for connection to the onboard electronics of the motorized vessel. In an embodiment, a slot or groove 92 may be cut within the semi-arcuate member 12 for the insertion of the lighted element 90', as shown in FIG. 6.

Figure 7:
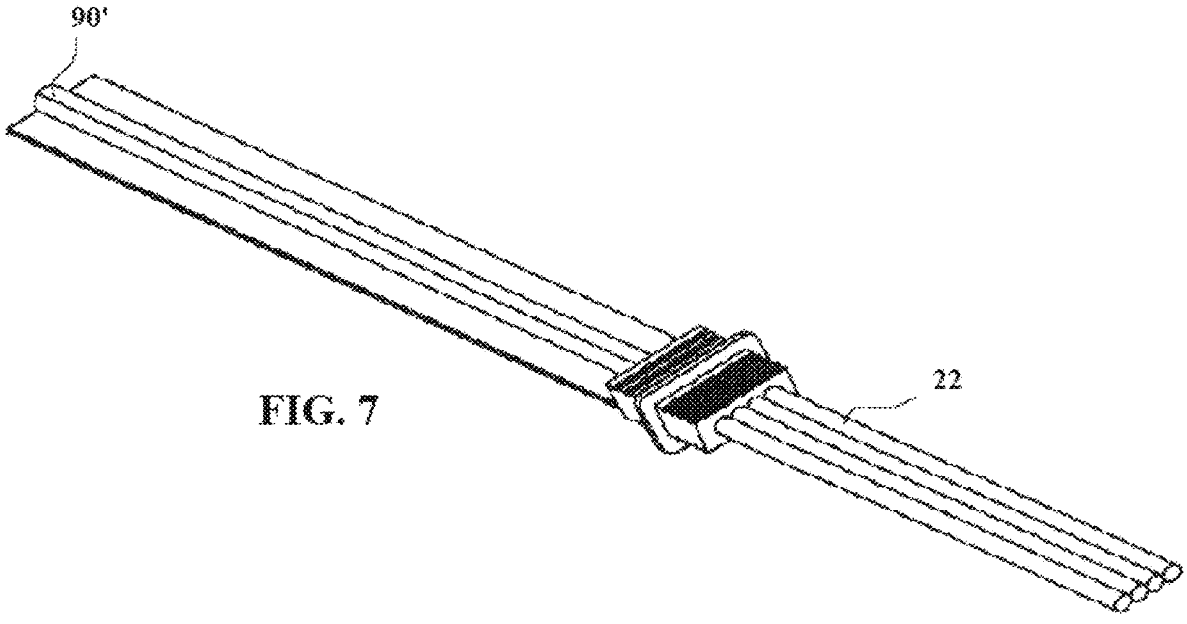
FIG. 7 is a perspective view of the LED light strip of the lighted grab bar of FIG. 6.

The lighted element may comprise a resilient, smooth housing of any desired length. In at least one embodiment, lighted element 90 may be an LED light strip comprising a diffusion housing, as shown in FIGS. 6-7 and taught in U.S. Pat. No. 12,098,836 issued on Sep. 24, 2024 to Research & Design Innovations, LLC, entitled "Diffused Lighting Assemblies and Methods of Installation on Marine Vessels and Land Vehicles," the entire disclosure of which is incorporated herein by reference. The lighted elements can be readily installed on the hand rail 10 underside and may be flush, or substantially flush with the outer surface of the hand rail. The lighted elements may be a programmable/nonprogrammable RGB LED or the like. The lighted elements may provide different color illumination by combining red, green and blue LED sources in any arrangement. Specific color LEDs may also be used. The light source may alternately be incandescent or other type of illumination. Any joining surface or seam between the lighted element 90, electrical connector 22, or fastener/post 30 may be sealed or "potted" to withstand exposure to weathering elements.

Figure 5:
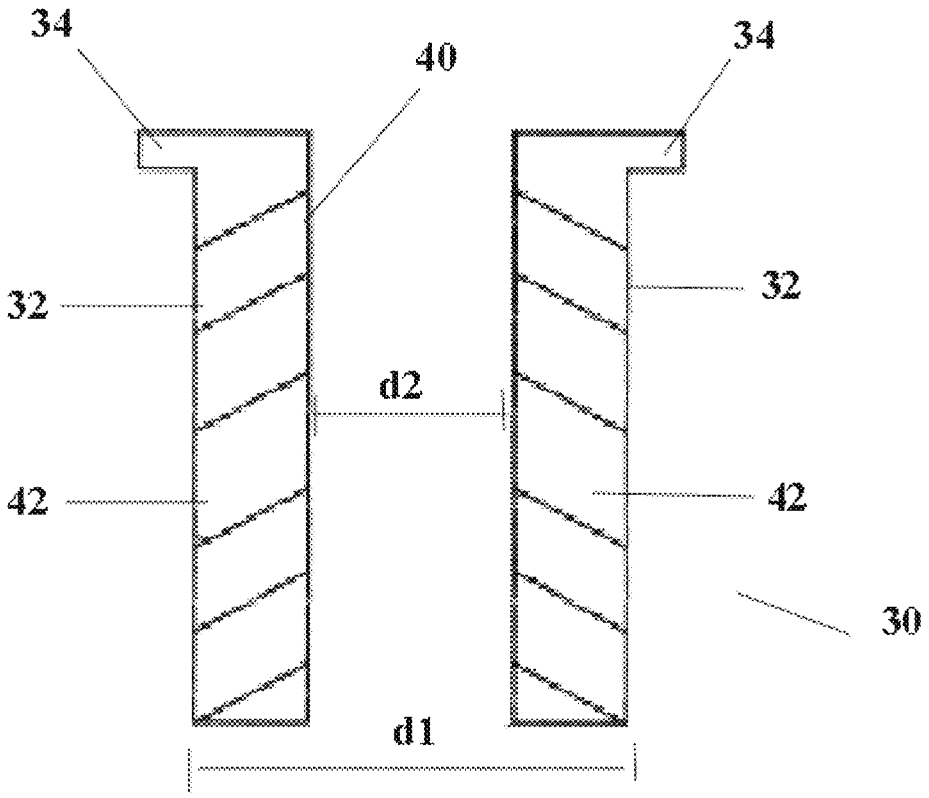
FIG. 5 is a side, cross-sectional view of a hollow fastener or post according to an embodiment of the present invention.

FIG. 5 depicts a cross-sectional view of an embodiment of a hollow fastener or post 30 according to the present invention. Preferably, fastener or post 30 comprises a hollow tubing having an outer diameter d1, and walls 42 with a thickness t, sufficient to maintain strength and integrity of the fastener; however, it should be understood by those skilled in the art that the post outer diameter and wall thickness may be modified per design requirements, dependent upon the expected load sustained. For example, a fastener or post 30 for securing a hand rail would typically require a greater outer diameter d1, and thicker walls 42, than would be required for a fastener securing an instrument panel or navigation device to an installation surface, as the instrument panel or navigation device is expected to sustain minimal load. Fastener or post 30 comprises an external engagement surface 32, which may be threaded or the like, extending rearward from an at least partially circumferentially-extending flange 34 for connection to a mounting surface of the accessory device at a proximal end of the fastener or post. In one or more embodiments, fastener 30 may be substantially cylindrical so as to engage a removable internally-threaded nut 104 (FIG. 6) comprising an opening sized to engage engagement surface 32, for securing the hand rail or other accessory to a surface of a marine vessel and/or recreational land vehicle (collectively, "motorized vessels") during installation.

Channel 40 having an inner diameter d2, extends between proximal and distal ends of fastener 30 along the length thereof, for passage of an electrical connector or wire harness 22 therethrough. It should be understood by those skilled in the art that the channel inner diameter d2 may be modified to accommodate product need and wire harness core diameter, per design requirements. In one or more embodiments, wire harness 22 may be shrink-wrapped or placed within a flexible conduit housing to facilitate feeding of the wire harness within the accessory device channel 6 and hollow fastener 30. Wire harness 22 may further be "potted" to exclude water, moisture, or corrosive agents, to increase resistance to shocks and vibrations, or to prevent gaseous phenomena, when in use such as on a marine vessel. In the embodiments shown in FIGS. 1-4 and 6, flange 34 may be welded or bonded to the foot 4*a*, 4*b* of the grab bar 10 using solvent, adhesive, spin-welding, vibration-welding, ultrasonic-welding or laser-welding techniques. It should be understood by those skilled in the art that in other embodiments, fastener or post 30 may be removably securable to foot 4*a*, 4*b*, so long as the joining surface or seam between the foot opening 16, 18 and the fastener or post channel 40 is sufficiently sealed to prevent water or other weathering elements from contacting the wire harness 22. Preferably, channel 40 of fastener 30 is aligned with an end of channel 6 of the accessory device, such as grab bar 10, and mounting surface opening 16 or 18, such that the wire harness 22 may be fed through the interior of the channel 6 before exiting through the distal end of fastener or post 30 for connection with an external power source 110 for operation of the lighted element 90', as shown in FIG. 6. In at least one embodiment, the terminal end of the wire harness may be fed into the hull of the marine vessel and tied into the on-board electronics.

It should be understood by those skilled in the art that the proximal end of the fastener or post can be integral with or connected to a mounting surface of any accessory device having an enclosed channel in the interior thereof or on a periphery of the accessory device and terminating in an opening in the mounting surface, such that a wire harness can be fed from the enclosed channel and through the fastener or post channel for connection to an external power source, and that the present invention is not limited to use with hand rails or grab bars. For example, the fastener or post of the present invention is intended to be compatible with accessory devices such as an illuminated cup holder, for example the lighted cup holder taught in U.S. Pat. No. 7,500,443 to Research & Design Innovations, LLC, entitled "Holder for a Containerized Beverage," wherein the rim of the cup holder defines an enclosed channel within which a light source is positioned. In such an embodiment, the wiring runs from the light source, through the enclosed channel defined by the rim of the cup holder to an opening in the mounting surface, and through the fastener or post channel, and terminates beyond the distal end of the fastener or post for connection to a power source. Similar concepts may be applied to communication or navigation devices, instrument panels, or device holders, for example, wherein an enclosed channel extends at least partially along a periphery of the accessory device for receiving a wire harness.

Fastener or post 30 may comprise a sufficiently rigid material, such as a polymer, metal, or metal alloy, for strength. In one or more embodiments, hand rail or grab bar 10 may comprise the same material as the fastener or post for ease of manufacture. The material may be solid and bored during the manufacturing process to facilitate the feeding of the wire harness 22 therethrough. The fastener 30 of the present invention may be sized to accommodate any gauge of electrical connector, and may be sized to hold any number of electrical connectors therein. The hollow fastener or post 30 acts as the housing for the wire harness and protects against crimping and other damage to the electrical connector 22, while eliminating additional drilling required to feed wiring to a lighted element. Moreover, by feeding the wire harness through the fastener or post, the post acts as a housing to protect the wire harness from damage upon installation, as well as subsequent thereto. For example, in a conventional prior art wire harness mount in a marine vessel, a separate hole must be drilled in the fiberglass hull, which could cut or fray the wiring as the wiring is fed through. By contrast, when using the hollow fastener or post of the present invention, the post prevents contact between the wire harness and the fiberglass hull at the point of installation, as the post is secured within an opening 102 in the installation surface 100 of the hull, as shown, for example, in FIG. 6.

It should be understood by those skilled in the art that the hollow fastener or post of the present invention may be used with accessory devices having, or adaptable to adding, a light source or other electrical connection, other than a hand rail, such as a communication or navigation device, or a cup holder or device holder, so long as the accessory device has a surface for mounting to an installation surface of the motorized vessel. In such an embodiment, the opening of the fastener or post should be aligned with an opening in the mounting surface of the accessory device so as to permit feeding of a wire harness therethrough, as described above.

The hollow fastener or post of the present invention solves one or more problems of installation of illuminated accessory assemblies in motorized vessels of the prior art. The present invention provides an improved fastening post which may be integral with or connected to an accessory device comprising a light source or other electrical connection, and can receive a wire harness therethrough for installation on a motorized vessel. As such, the present invention provides an improved method of installing an illuminated accessory assembly that eliminates the need to drill a separate wiring hole through the installation surface or the accessory assembly itself. A further advantage of the present invention is that it expands the aftermarket for illuminated accessory assemblies by permitting retrofitting of an illuminated accessory assembly for a motorized vessel, wherein the wiring can be tied into the onboard electronics without requiring the installation of a new wire run.

While the present invention has been particularly described, in conjunction with specific embodiments, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A method of installing an illuminated accessory device on a surface of a motorized vessel, comprising:
- providing an accessory device comprising:
  - a mounting surface for mounting to an installation surface of the motorized vessel, said mounting surface having at least one opening;
  - an enclosed channel in an interior portion of or on a periphery of the accessory device, said enclosed channel terminating at one end at said mounting surface opening;
  - a light source disposed within or secured to said accessory device and having an illumination surface flush or substantially flush with an outer surface of the accessory device;
  - a fastener or post integral with or connected to said accessory device mounting surface, said fastener or post having proximal and distal ends and comprising a channel extending between said proximal and distal ends along a length thereof, said fastener or post further comprising an external engagement surface extending axially in a direction away from the interior portion of the accessory device; and
  - a wire harness extending within said enclosed channel and through said fastener or post channel, said wire harness electrically connected at a first end to said light source and having a terminal end extending beyond said distal end of said fastener or post;
- connecting said terminal end of said wire harness to an electrical power source of said motorized vessel; and
- engaging said external engagement surface of said fastener or post with an opening in the installation surface of the motorized vessel to mechanically attach said accessory device to said installation surface.

2. The method of claim 1 wherein said accessory device comprises a hand rail or grab bar, a communication device, a navigation device, an instrument panel, a cup holder, or a device holder.

3. The method of claim 1 wherein said fastener or post is a substantially cylindrical, open-ended threaded post, and wherein the step of engaging said external engagement surface of said fastener or post with an opening in the installation surface of the motorized vessel further comprises:

engaging said threaded post with an internally threaded nut of said installation surface to secure said accessory device to said installation surface.

4. The method of claim 1 further comprising the steps of:

providing power to said light source via said wire harness; and illuminating an area proximate the accessory device.

5. An illuminated accessory device for use on a motorized vessel, comprising:

a mounting surface for mounting to a surface of the motorized vessel, said mounting surface having at least one opening;

an enclosed channel in an interior portion of or on a periphery of the accessory device, said enclosed channel terminating at one end at said mounting surface opening;

a light source disposed within or secured to said accessory device and having an illumination surface flush or substantially flush with an outer surface of the accessory device;

a fastener or post integral with or connected to said accessory device mounting surface, said fastener or post having proximal and distal ends and comprising a channel extending between said proximal and distal ends along a length thereof, said fastener or post further comprising an external engagement surface extending axially in a direction away from the interior portion of the accessory device; and a wire harness extending within said enclosed channel and through said fastener or post channel, said wire harness electrically connected at a first end to said light source and having a terminal end extending beyond said distal end of said fastener or post, wherein said fastener or post provides mechanical attachment to the surface of the motorized vessel via the external engagement surface and also serves as a conduit for the wire harness; and wherein upon connection of said wire harness terminal end to a power source, the light source is adapted to illuminate an area proximate the accessory device.

6. The illuminated accessory device of claim 5, wherein each fastener or post further comprises a flange welded or bonded to said mounting surface.

7. The illuminated accessory device of claim 5, wherein said fastener or post channel is aligned with said mounting surface opening at an end of the enclosed channel.

8. The illuminated accessory device of claim 5, wherein said fastener or post comprises an external engagement surface for engaging an opening in an installation surface of the motorized vessel.

9. The illuminated accessory device of claim 8, wherein said external engagement surface is threaded.

10. The illuminated accessory device or claim 5, wherein said fastener or post is a substantially cylindrical, open-ended threaded post.

11. The illuminated accessory device of claim 5, wherein said light source is secured within said enclosed channel.

12. The illuminated accessory device of claim 5, further comprising a slot and wherein said light source is received within said slot.

13. The illuminated accessory device of claim 12, wherein said light source is LED strip lighting.

14. The illuminated accessory device of claim 5, wherein said light source is LED strip lighting.

15. The illuminated accessory device of claim 5, wherein said fastener or post is comprised of a polymer, a metal, or a metal alloy.

16. The illuminated accessory device of claim 5, wherein the accessory device comprises a hand rail or grab bar, a communication device, a navigation device, an instrument panel, a cup holder, or a device holder.

17. A hand rail for providing illumination to a surface of a motorized vessel, the hand rail comprising:

a central bar member having opposing ends and a pair of feet, each foot disposed at one end of the central bar member and at least one foot comprising an opening;

a channel in an interior portion of said central bar member, said channel terminating at one or both ends at said foot opening or openings;

a light source disposed within or connected to said central bar member, said light source having an illumination surface flush or substantially flush with an outer surface of the central bar member;

a fastener or post integral with or connected to each foot of the pair of feet, each fastener or post having proximal and distal ends and at least one of said fasteners or posts comprising a channel extending between said proximal and distal ends along a length thereof, said fastener or post further comprising an external engagement surface extending in a direction away from the hand rail interior portion channel; and a wire harness extending within said central bar member channel and through said fastener or post channel, said wire harness electrically connected at a first end to said light source and having a terminal end extending beyond a distal end of said fastener or post, wherein said fastener or post provides mechanical attachment to the surface of the motorized vessel via the external engagement surface and also serves as a conduit for the wire harness; and wherein upon connection of said wire harness terminal end to a power source, the light source is adapted to illuminate an area proximate the hand rail.

18. The hand rail of claim 17, wherein each fastener or post further comprises a flange welded or bonded to said foot.

19. The hand rail of claim 17, wherein said fastener or post is a substantially cylindrical, open-ended threaded post.

20. The hand rail of claim 17, wherein said light source is LED strip lighting.

* * * * *